May 6, 1941.   J. H. STAAK   2,241,073
DYNAMOELECTRIC MACHINE
Filed July 10, 1940

Inventor:
Julius H. Staak,
by Harry E. Dunham
His Attorney.

Patented May 6, 1941

2,241,073

UNITED STATES PATENT OFFICE 2,241,073

DYNAMOELECTRIC MACHINE

Julius H. Staak, Fort Wayne, Ind., assignor to General Electric Company, a corporation of New York Application July 10, 1940, Serial No. 344,722

4 Claims. (Cl. 172—36)

My invention relates to improvements in dynamoelectric machines and more particularly to an arrangement for retaining the stationary member of the machine within a supporting casing.

An object of my invention is to provide an improved and simplified dynamoelectric machine construction utilizing a simplified arrangement for retaining the stationary member of the machine in position within a casing.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
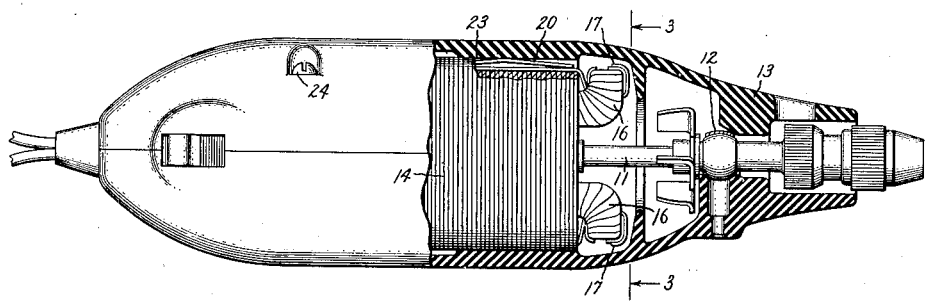
Figure 2:
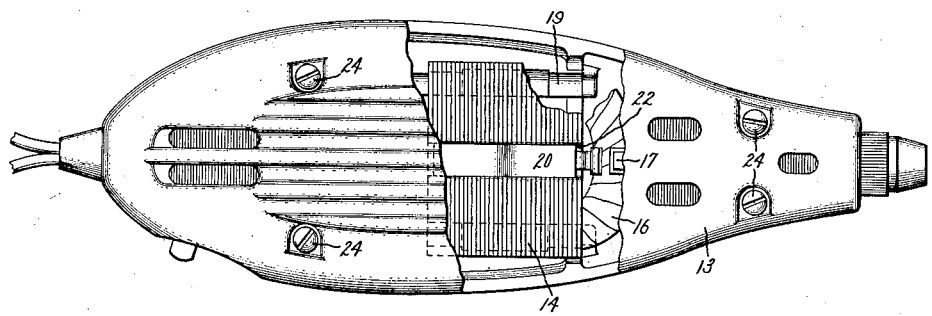
Figure 3:
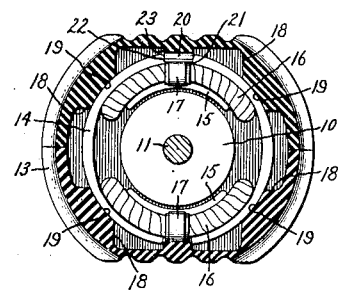
Figure 4:
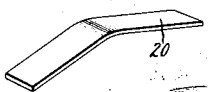

In the drawing, Fig. 1 is a side elevational view, partly broken away, showing a dynamoelectric machine provided with my improved positioning and securing arrangement; Fig. 2 is a plan view of the machine shown in Fig. 1, partly broken away to illustrate the relative arrangement of the stationary member and the supporting casing; Fig. 3 is a sectional view taken along line 3—3 of Fig. 1; and Fig. 4 is a perspective view of the V-shaped leaf spring used for retaining the stationary member in position within the casing.

Referring to the drawing, I have illustrated a dynamoelectric machine having a rotatable member 10 mounted on a shaft 11 which is supported in similar spherical bearings 12 at each end thereof mounted in a longitudinally divided two-part supporting casing 13 formed of any suitable insulating material such as a phenolic condensation resin product. The stationary member of the dynamoelectric machine is provided with a laminated core 14 on which is formed a pair of pole pieces 15. The pole pieces 15 are adapted to be excited by field exciting windings 16 which extend about the pole pieces and are secured to the stationary member by retaining clips 17. In order to retain the stationary member in position in the casing 13, a plurality of bosses 18 having supporting surfaces 19 is formed in the casing 13 and is arranged to engage the outer peripheral surface of the stationary member core 14. The stationary member of the dynamoelectric machine is held against rotation in the casing 13 by a V-shaped leaf spring 20 which extends outwardly adjacent the center portion thereof and is arranged with the ends thereof in engagement with a substantially flat surface 21 formed in the bottom of a groove 22 in one side of the stationary member core 14. This spring is adapted to bias the stationary member core 14 into firm engagement with the supporting surfaces 19 of the bosses 18 by a flange or rib 23 formed on the upper half of the casing 13 when the two halves of the casing 13 are secured together by through bolts 24.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a stationary member and a rotatable member, a groove formed in one side of said stationary member, a supporting casing for said dynamoelectric machine members, a spring arranged in said groove of said stationary member, and means including a rib on said casing arranged in engagement with said spring to bias said spring towards said stationary member for retaining said stationary member in position in said casing.

2. A dynamoelectric machine having a stationary member and a rotatable member, a substantially flat surface formed on one side of said stationary member, a longitudinally divided two-part casing having supporting surfaces engaging the outer surface of said stationary member, and means including a spring arranged in engagement with said flat surface of said stationary member and in engagement with said casing to bias said spring towards said stationary member for retaining said stationary member in position in said casing.

3. A dynamoelectric machine having a stationary member and a rotatable member, a longitudinally extending groove formed in one side of said stationary member, a casing having supporting surfaces engaging the outer peripheral surface of said stationary member, a V-shaped leaf spring arranged in said groove of said stationary member, and means including a rib on said casing arranged in engagement with said spring to bias said spring towards said stationary member for retaining said stationary member in position in said casing.

4. A dynamoelectric machine having a stationary member and a rotatable member, a flat surface formed on one side of said stationary member, a longitudinally divided two-part casing having supporting surfaces engaging the outer surface of said stationary member, and means including a spring extending outwardly adjacent the center thereof arranged in engagement with said casing and in engagement with said flat surface of said stationary member to bias said spring towards said stationary member for retaining said stationary member in position in said casing.

JULIUS H. STAAK.